US012458893B2

(12) United States Patent
Henderson et al.

(10) Patent No.: US 12,458,893 B2
(45) Date of Patent: Nov. 4, 2025

(54) MULTIPLAYER VIDEO GAME SYSTEMS AND METHODS

(71) Applicant: Sony Interactive Entertainment Inc., Tokyo (JP)

(72) Inventors: Christopher William Henderson, London (GB); David Erwan Damien Uberti, London (GB); Michael Richard Reynolds, Southampton (GB)

(73) Assignee: Sony Interactive Entertainment Inc., Tokyo (JP)

( * ) Notice: Subject to any disclaimer, the term of this patent is extended or adjusted under 35 U.S.C. 154(b) by 284 days.

(21) Appl. No.: 18/321,152

(22) Filed: May 22, 2023

(65) Prior Publication Data

US 2023/0381672 A1 Nov. 30, 2023

(30) Foreign Application Priority Data

May 25, 2022 (GB) ...................................... 2207661

(51) Int. Cl.

| | |
|---|---|
| ***A63F 13/843*** | (2014.01) |
| ***A63F 13/35*** | (2014.01) |
| ***A63F 13/52*** | (2014.01) |
| ***A63F 13/54*** | (2014.01) |

(52) U.S. Cl.

CPC ............ *A63F 13/843* (2014.09); *A63F 13/35* (2014.09); *A63F 13/52* (2014.09); *A63F 13/54* (2014.09)

(58) Field of Classification Search

None

See application file for complete search history.

(56) References Cited

U.S. PATENT DOCUMENTS

| | | |
|---|---|---|
| 2014/0195912 A1 | 7/2014 | Odorovic |
| 2014/0274368 A1 | 9/2014 | Cotter |
| 2015/0174478 A1 | 6/2015 | Barak |
| 2017/0165569 A1 | 6/2017 | van Welzen |
| 2018/0161675 A1 | 6/2018 | Miron |
| 2020/0206615 A1 | 7/2020 | Cotter |

FOREIGN PATENT DOCUMENTS

| | | |
|---|---|---|
| EP | 2709359 A2 | 3/2014 |
| WO | 2022076966 A1 | 4/2022 |

OTHER PUBLICATIONS

Combined Search and Examination Report for corresponding GB Application No. 2207661.6, 7 pages, dated Nov. 17, 2022.

Extended European Search Report for corresponding EP Application No. 23172757, 12 pages, dated Oct. 20, 2023.

Extended Report for corresponding GB Application No. 2207661.6, 4 pages, dated Jun. 12, 2024.

*Primary Examiner* — Damon J Pierce

(74) *Attorney, Agent, or Firm* — Kilpatrick Townsend & Stockton LLP

(57) ABSTRACT

A method of executing a multiplayer video game includes: connecting a game client to a game server via a communication network; for each player, executing an instance of a game on the game server to generate a game environment; synchronizing game data between multiple instances of the game to link the generated game environments; transmitting user inputs to the game server to initiate interactive gameplay; for each player, generating a video stream of the linked game environment from the player's perspective; and mixing the video streams for individual players into split screen view during a split screen mode.

15 Claims, 7 Drawing Sheets

MULTIPLAYER VIDEO GAME SYSTEMS AND METHODS

BACKGROUND OF THE INVENTION

Field of the Invention

The present invention relates to multiplayer video game systems and methods.

Description of the Prior Art

Multiplayer online games are games where each user, with their own game console or computer, joins a server-hosted game. The server keeps track of where all the players are, receive inputs/updates from each client device and send them back game state updates so they can render the game on screen from the corresponding player's own viewpoint. Hence each player is alone but in a shared environment with other remotely located players. Notably, typically the environment is shared by 16/32/64 people, so there are typically many parallel copies of the environment hosting various client devices at any one time to service thousands or millions of players. A typical example of this would be massive multiplayer online role play games (MMORPG) and arena battle games.

By contrast local or split-screen games allow for multiple players gaming in the same room, i.e. running one game locally on their game console that supports multiple players' views at the same time. Hence in this case the players (typically up to four) are together, which makes for a more sociable experience. A typical example of this would be cooperative multiplayer games and "couch multiplayer games".

Cloud gaming, or game streaming, is where the videogame console running the game is in the cloud (typically a rack-mounted PlayStation or a virtual machine), and the rendered video/audio is streamed to the user, whilst their inputs from their controller are uploaded by the client device to the cloud. This enables users to play games on devices that may not otherwise be capable of playing them. For example, a phone or a smart TV could play PlayStation 5 games this way using an app to stream the video down and upload inputs from a Bluetooth controller.

Current approaches to conducting multiplayer video games tend to suffer from one or more of a multiplicity of drawbacks:

Firstly, multiplayer online games usually allow a game console to support only one player. In other words, even if two or players are in the same physical location, each player needs to bring along his own game console in order to play multiplayer online games together.

Secondly, for multiplayer games that require individual perspective views rendered for each player, such as car racing games or first person shooting games, the graphic quality may drop significantly because the workload on the game console is multiplied by the number of players. Examples of graphic quality drop includes jerky gameplay due to low frame rate, or screen tearing caused by the GPU operating out of sync with the display device.

The present invention seeks to mitigate or alleviate some or all of the above-mentioned problems.

SUMMARY OF THE INVENTION

Various aspects and features of the present invention are defined in the appended claims and within the text of the accompanying description.

In a first aspect, a method of executing multiplayer video game is provided in accordance with claim 1.

In another aspect, a game server for a multiplayer video game is provided in accordance with claim 7.

In a further aspect, a game client for a multiplayer video game is provided in accordance with claim 12.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A multiplayer video game system and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Embodiments of the present description are applicable to a multiplayer video game system involving a computer server or videogame server, a computer client or videogame console, a development kit for such a system, or a multiplayer video game system using dedicated hardware or a computer and suitable controllers. In the present application terms such as 'user' and 'player' may be used interchangeably except where indicated otherwise.

Figure 1:
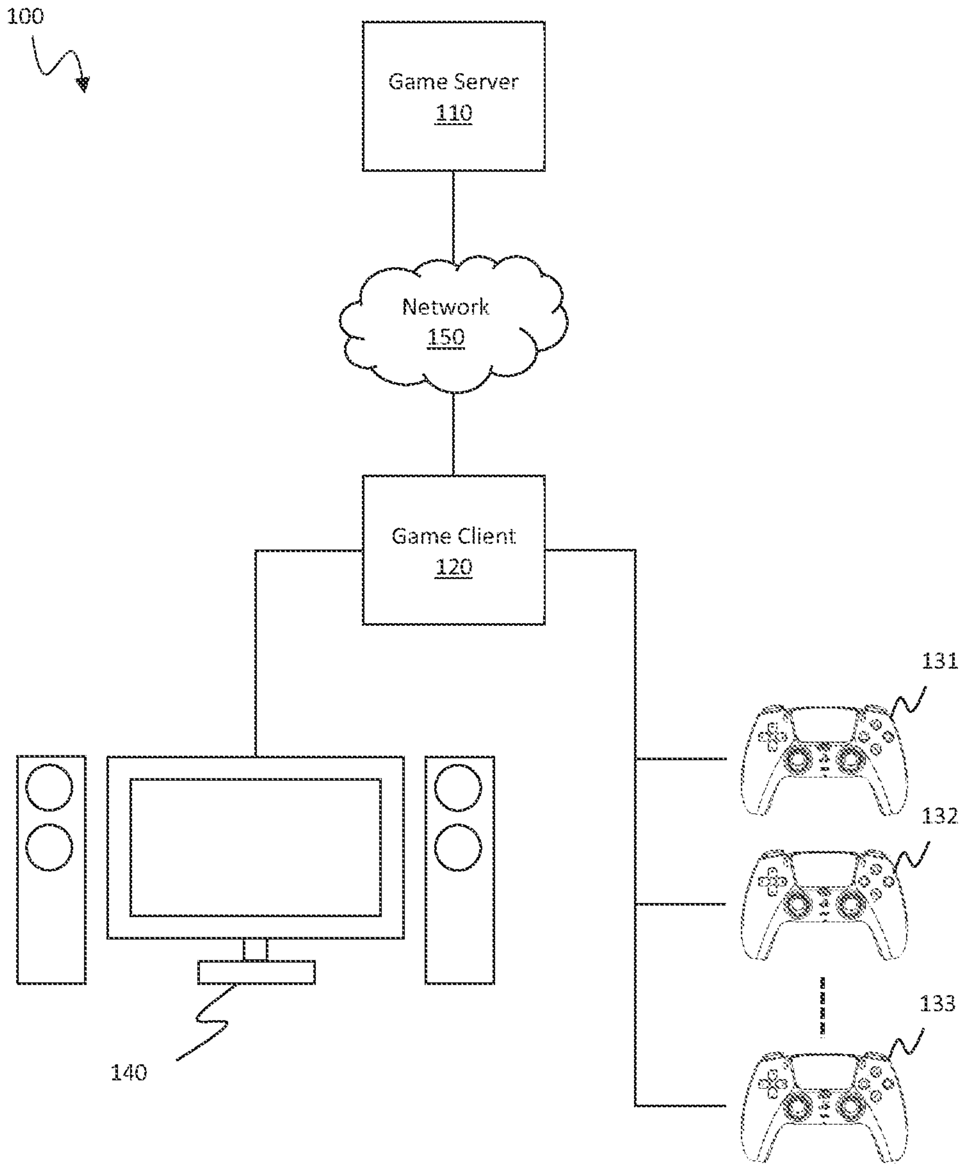
FIG. 1 is a schematic diagram of a multiplayer video game system in accordance with embodiments of the present application.

For the purposes of explanation and referring now to the drawings, wherein like reference numerals designate identical or corresponding parts throughout the several views, FIG. 1 is a schematic diagram of a multiplayer video game system 100 in accordance with embodiments of the present application. The multiplayer video game system 100 may comprise a game server 110, a game client 120, multiple game controllers 131-133, a display device 140, and a network 150.

According to embodiments of the disclosure, the multiplayer video game system 100 allows users to play a multiplayer game as if it is a split screen local game, without having to alter the multiplayer game code itself. In this case in summary a game client 120, such as a PlayStation®, would request two or more cloud versions of the game to be run. Normally these would be independent instances and therefore would likely end up in different copies of the game environment. The two or more cloud versions are identified as linked in a certain extent so that the game server 110 can send them both in the same copy of a game environment. The user's game client 120 can then receive the two or more video streams and arranges them in a split screen view on a single display device 140, so that the user and their friend(s) can play in the same physical location rather than separately.

Modern display devices, such as flat panel TVs, have sufficiently high resolution to display game screen details even under split screen view. For instance, a 4K Ultra HD (3840×2160) can display four split screens of Full HD 1080p (1920×1080), and a 8K Full Ultra HD (7620×4320) can display four split screens of 4K Ultra HD or sixteen split screens of Full HD 1080p. Meanwhile a conventional Full HD 1080p (1920×1080) is also sufficient to adequately display split screens. In embodiments of the present application, if the display device may contain two or more monitors, screen splitting can be performed in such a way that the game screen for each player is assigned to one of the monitors.

Additionally, input from the different players' controllers 131-133 will need to be sent to the correct instance of the cloud game. Although FIG. 1 shows only three controllers, one can generalise from three instances to a plurality which is usually limited by the number of split screens to be shown on the display device at once.

Referring to FIG. 1, the game server 110 executes game code for a multiplayer video game in order to provide streaming game service such as PS NOW®. The streaming game service may include creating game environments in which the players can interact with the game elements through operating with the game controllers 131-133.

The game server 110 further generates game feedbacks to the player based on their interaction with game elements, including visual feedback such as video streams of the game environment based on the player's perspective; audio feedback such as game instructions, background music, character speech, audio tracks and sound effects of the game environment; and haptic feedback effects such as vibration on the game controllers 131-133.

According to embodiments of the present application, the game server 110 may comprise multiple physical nodes. Multiple instances of a game may be run in the physical nodes in a parallel manner such that each copy of game code is executed in a game machine to generate a game environment for a player. The game machines themselves may be the physical nodes and/or one or more virtual machines running on one or more physical nodes. The game environments corresponding to each player may be linked through synchronization of game data between the game machines. For example, the players in a car racing game may share the same race track and the game screen of each player displays the position of other players on the track.

The game server 110 is connected to a local game client 120, such as the Sony® PlayStation 5® (PS5), over a network, such as the Internet. The game client 120 is in turn connected to multiple game controllers 131-133 and display device 140. The game client 120 receives user input from the game controllers 131-133 and relays the same to the corresponding game machines in the game server 110.

According to embodiments of the present application, the game client 120 receives video streams from the physical and/or virtual game machines and arranges them to be displayed in split screen view. The game client 120 subsequently transmits the mixed video stream to the display device. In embodiments of the present application, the game client 120 may send other player-specific feedback signals to the corresponding peripheral devices, such as sending haptic feedback signal to a game controller or audio feedback signal to a headset associated with the relevant player.

According to embodiments of the present application, the game server 110 may mix the video data or video streams generated by the physical and/or virtual game machines and arrange them to be displayed in split screen view. The game server 110 subsequently transmits a video stream containing the split screen view to the game client 120. The arrangement provides the advantage of further reducing the workload of the game client 120. Since only one video stream, instead of multiple video streams in full screen resolution for individual players, is required to be transferred from the game server 110 to the game client 120, a more efficient use of the transmission bandwidth can also be achieved.

Figure 2:
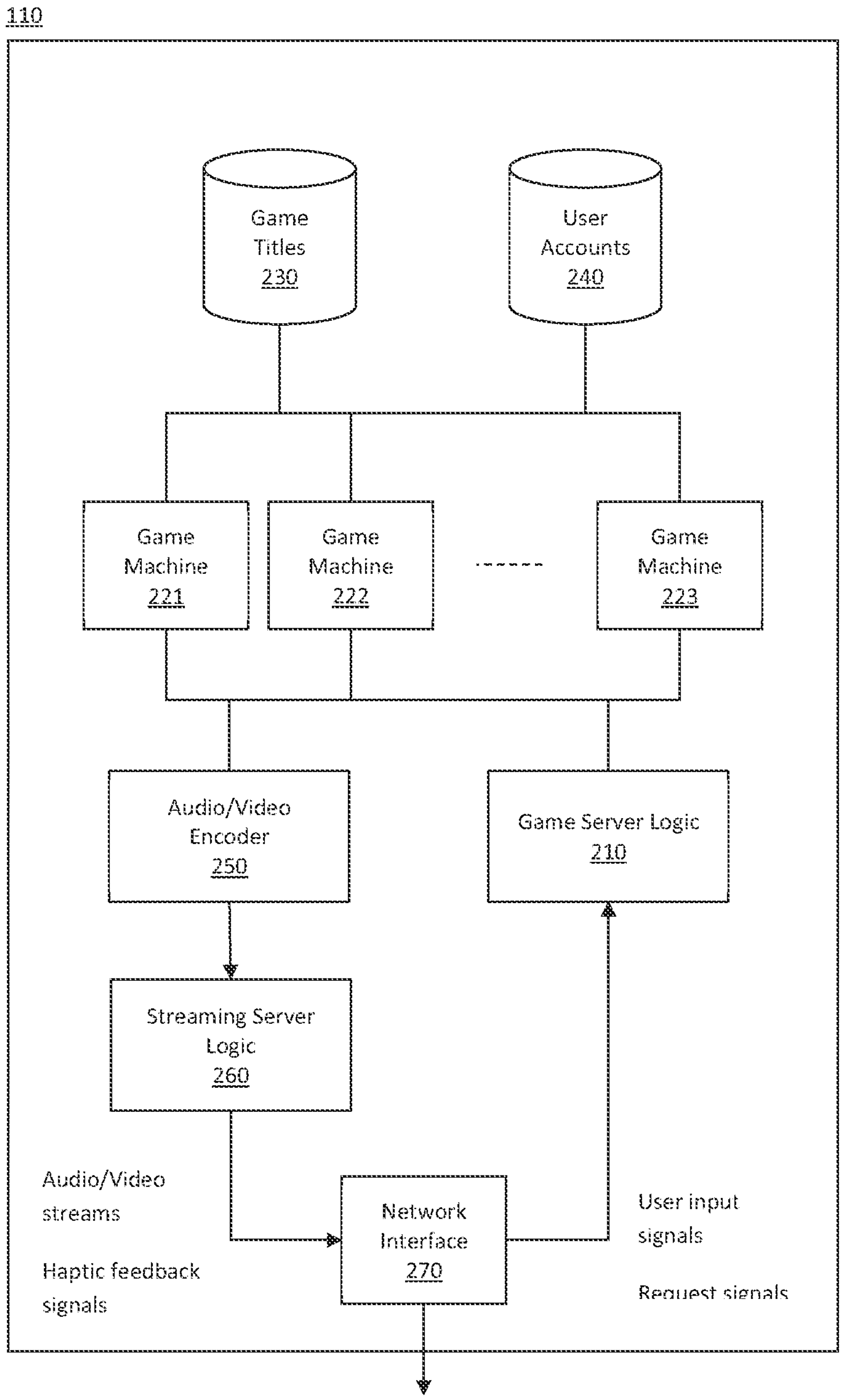
FIG. 2 is a schematic diagram of a game server in accordance with embodiments of the present application.

FIG. 2 illustrates a schematic diagram of a game server 110 of FIG. 1 in accordance with embodiments of the present application. The game server 110 comprises a game server logic 210, multiple physical or virtual game machines 221-223, a game titles database 230, a user accounts database 240, an audio/video encoder 250, a streaming server logic 260 and a network interface 270.

The game server logic 210 receives user input signals and request signals from the game client 120 via the network interface 270. Based on the user input signals and request signals to launch a multiplayer game, the game server logic 210 also assigns game machines 221-223 to individual player accounts, or optionally to one or more identified player accounts and guest accounts temporarily associated with the one or more identified player accounts, to enable unknown users (for example friends of the owner of the game client) to play in a current play session without having an account of their own. Optionally unknown users can provide details to change such guest accounts into player accounts, for example it they want to preserve game progress made between play sessions.

Each of the game machines 221-223 execute an instance of the game which is loaded from game titles database 230. The game machines 221-223 may optionally further load user save data from the user accounts database 240 in order to initiate gameplay for individual player accounts. Although FIG. 2 shows only three game machines, any number of game machines is envisaged.

According to embodiments of the present application, the game machines 221-223 may provide game functionalities including game logic and graphics engine. The game logic defines the game play and processes user input signals acquired from the game controllers. The graphics engine renders 2D or 3D computer graphics for the game environment as a result of the game logic.

During the gameplay, each of game machines 221-223 generates a game environment of which the video data, audio data and optionally haptic feedback data are captured by the audio/video encoder 250. The video and audio data are encoded and compressed according to selected video and audio codec standards. The encoded video and audio data are further converted by the streaming server logic 260 into video streams and audio streams according to a selected streaming protocol. Finally, the network interface 270 packetizes the video streams, audio streams and optionally haptic feedback data for transmitting to the game client 120 over the network 150.

Figure 3:
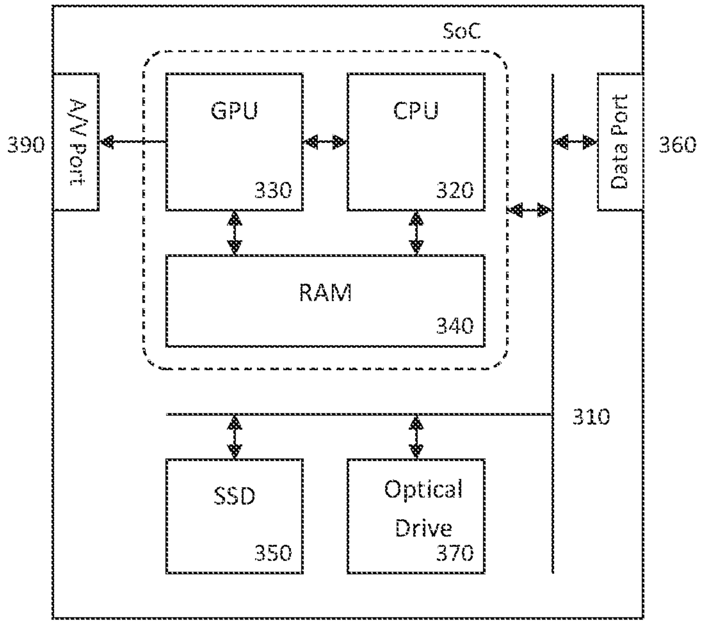
FIG. 3 is a schematic diagram of an entertainment device in accordance with embodiments of the present application.

FIG. 3 illustrates a schematic diagram of an entertainment device in accordance with embodiments of the present application. The entertainment device comprises a central processor 320. This may be a single or multi core processor, for example comprising eight cores as in the PS5. The entertainment device also comprises a graphical processing unit or GPU 330. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 350, either as an external or internal hard drive, or as an external solid state drive, or an internal solid state drive as in the PS5.

The entertainment device may transmit or receive data via one or more data ports 360, such as a USB port, Ethernet® port, WiFi® port, Bluetooth® port or similar, as appropriate. It may also optionally receive data via an optical drive 370.

Interaction with the system is typically provided using one or more handheld controllers 380, such as the DualSense® controller in the case of the PS5.

Audio/visual outputs from the entertainment device are typically provided through one or more A/V ports 390, or through one or more of the wired or wireless data ports 360.

Where components are not integrated, they may be connected as appropriate either by a dedicated data link or via a bus 100.

Such an entertainment device may be used as a game client 120 in a multiplayer video game system 100 for two or more players to conduct multiplayer video games in network mode. It will be appreciated that this is a non-limiting example and that as noted previously herein other examples of a game client may include a phone or smart television. In addition, the entertainment device, as an exemplary game client, may be used to mix multiple video streams corresponding to different players' perspective into split screen view.

Figure 4:
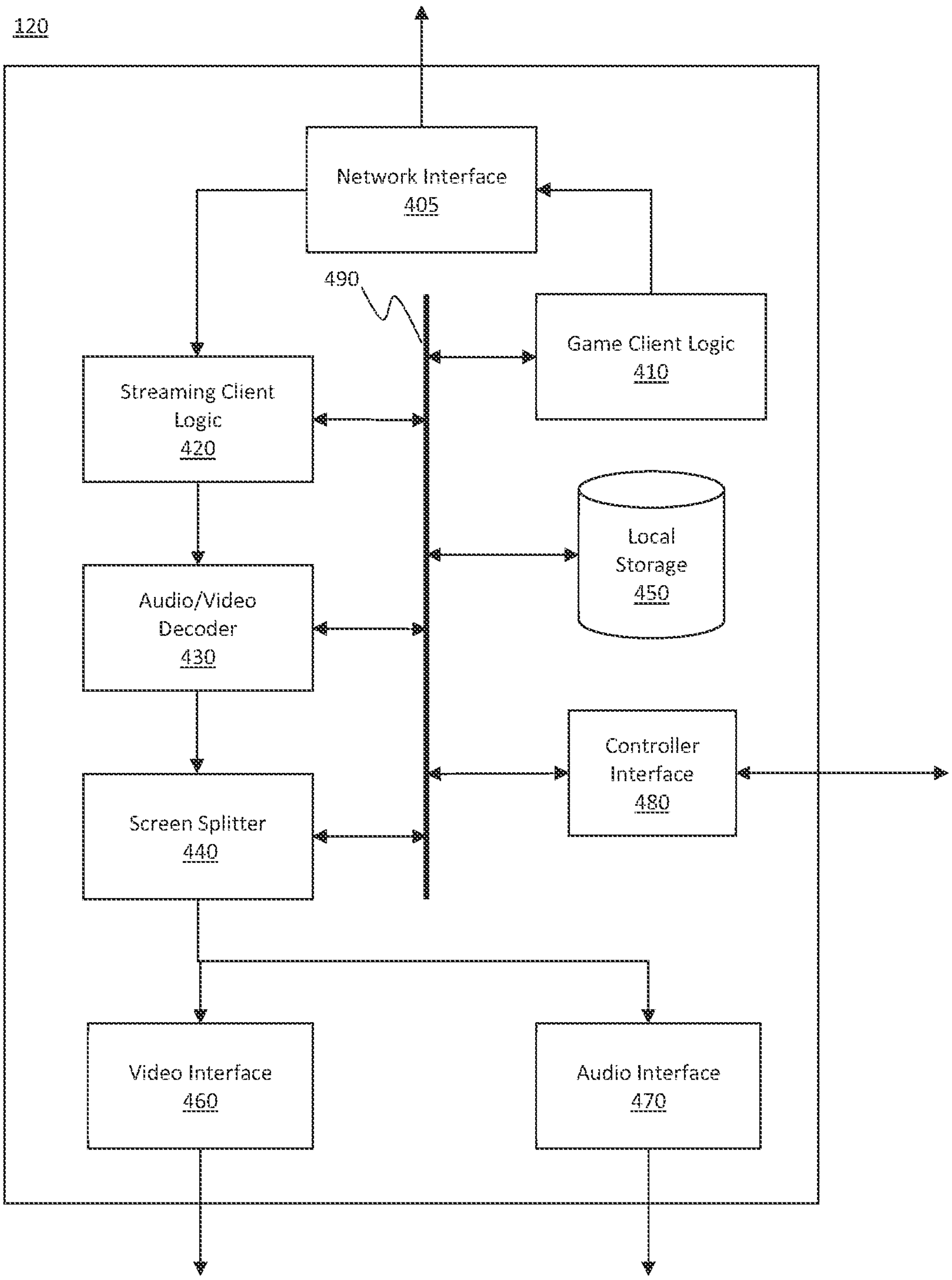
FIG. 4 is a schematic diagram of a game client in accordance with embodiments of the present application.

FIG. 4 illustrates a schematic diagram of a game client 120 of FIG. 1 in accordance with embodiments of the present application. The game client 120 comprise a network interface 405, a game client logic 410, a streaming client logic 420, an audio/video decoder 430, a screen splitter 440, a local storage 450, a video interface 460, an audio interface 470, a controller interface 480 and a bus 490. In operation, the game client logic 410 receives a user request from the controller interface 480 to launch a multiplayer game in split screen view.

The network interface 405 packetizes the user request and transmits the packets to the game server 110. In response to the user request, the game server 110 executes an instance of the game for each player account and generates video streams, audio streams and optionally haptic feedback signals corresponding to the gameplay for individual players. The streaming data and signals for the two or more players are received by the network interface 405 of the game client 120 in the form of network packets.

The network interface 405 reassembles the network packets into video streams, audio streams and haptic feedback signals. The streaming client logic 420 then converts the video and audio streams into video and audio data based on the selected streaming protocol. The audio/video decoder 430 further decodes the encoded audio and video data according to the selected codec. The resulting video and audio data are subsequently fed into the screen splitter 440, where the video data for the two or more players are mixed into video data containing a split screen display.

The mixed video data is then transmitted to the external display device 140 via the video interface 460. The audio signal containing player specific audio track is demultiplexed and transmitted to the external headphones associated with different players through the audio interface 470. If no external headphone is connected to the client device 120, a universal audio track in the audio signal is sent to an external speaker via the audio interface 470.

Furthermore, any haptic feedback signal received by the streaming client logic is demultiplexed by the controller interface 480 and transmitted to the respective game controllers 131-133. User data such as screen resolution and screen position customized for each player in screen split mode is stored in the local storage 450. The internal communication between the game client logic 410, the streaming client logic 420, the audio/video decoder 430, the screen splitter 440, the local storage 450 may be conducted via the bus 490.

Figure 5A:
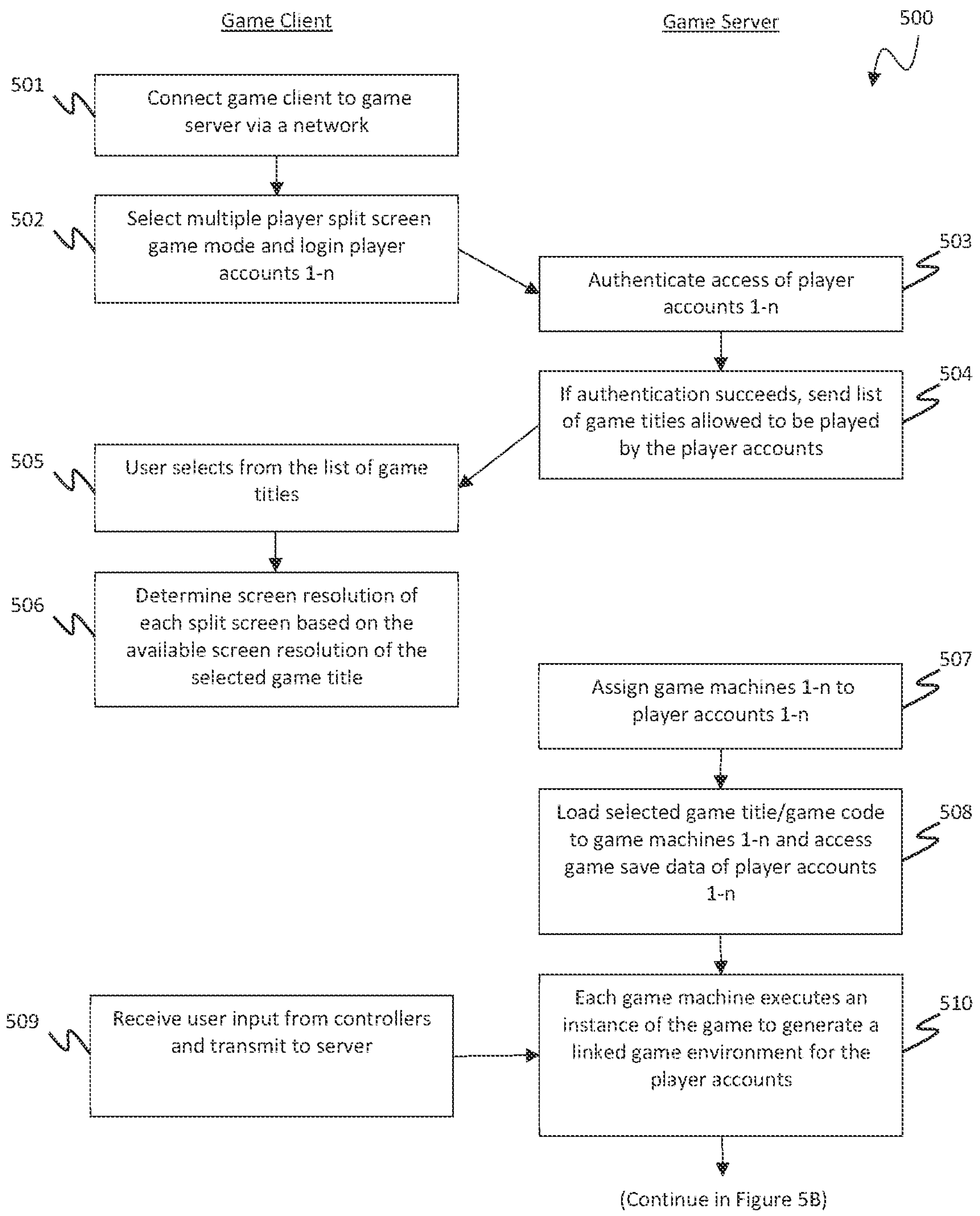
FIGS. 5A and 5B are a flow diagram of a method of executing a multiplayer video game system in accordance with embodiments of the present application.
Figure 5B:
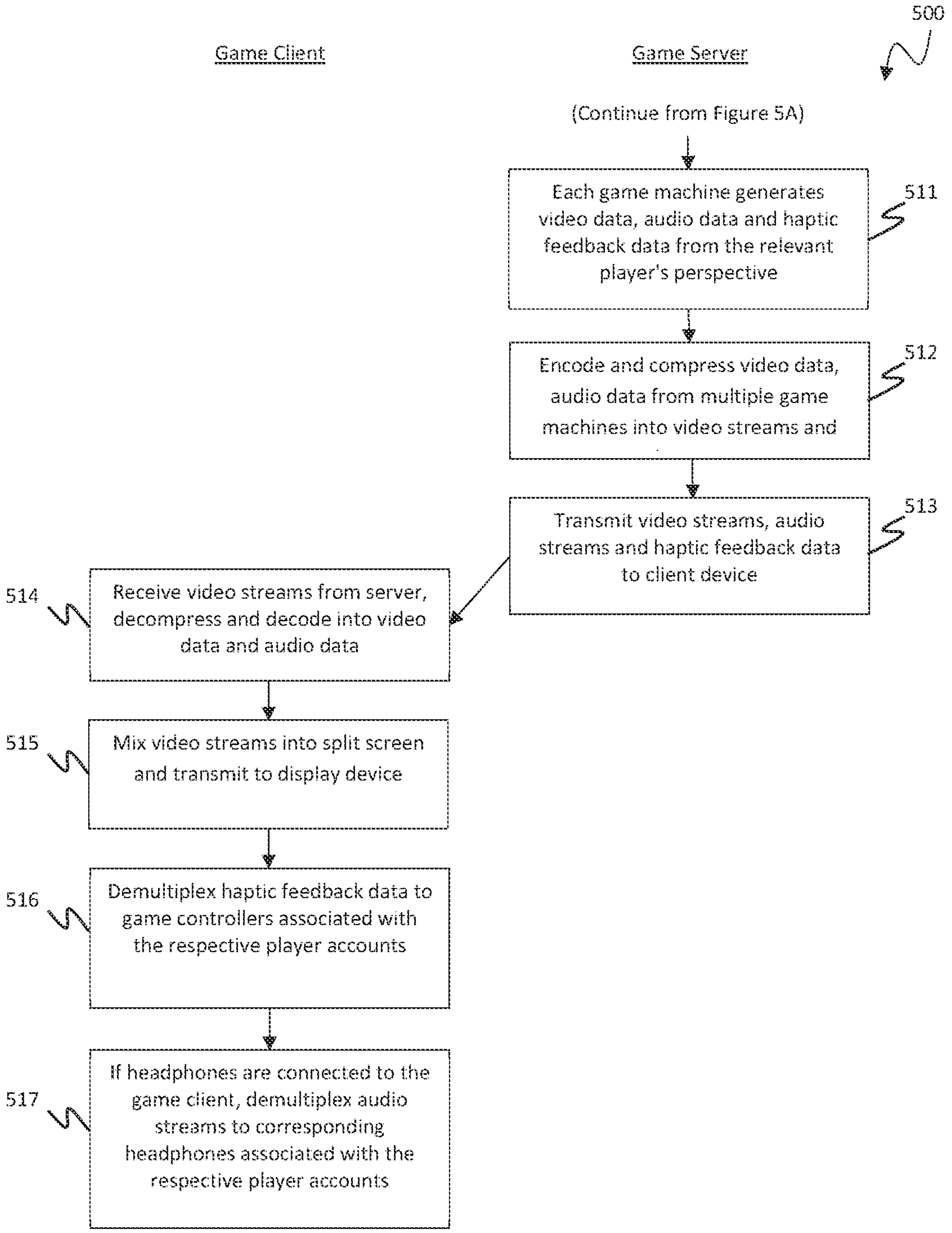

FIGS. 5A and 5B show a flow diagram describing a computerized process 500 of executing a multiplayer video game system of FIG. 1 in accordance with embodiments of the present application. Process 500 may begin at step 501, where the user connects the game client 120 to the game server 110 over a communication network 150, such as the Internet.

At step 502, the user selects playing network games, for example, by choosing a menu item to login a game streaming platform. The user additionally requests the network games to be conducted in multiple player split screen view. The game client 120 may prompt the user to enter login details for the multiple player accounts of the game streaming service. Alternatively, player accounts associated with each controller may already be known, for example being identified when each controller links to the game client. Similarly the status of a player as a guest without an account may be known by or indicated to the game client. The game client 120 sends a request to the game server 110 to enter the game streaming platform. In embodiments of the present application, the login details may include user account name, password, server name, and country/region in which the server is located or the user account is registered.

At step 503, the game server 110 authenticates access of the multiple player accounts or guest accounts based on the login details provided by the game client 120. If the authentication fails, for example, because the user name and password do not match, the game server 110 may ask the user to enter the login details again. In embodiments of the present application, if the user name is not found in the user accounts database, the game server 110 may invite the user to register a new account. It will be appreciated that user authentication and the associated user accounts database may be provided by a third party server.

At step 504, if authentication succeeds, the game server 110 may send a list of game titles allowed to be played by the player accounts in multiple player split screen view. The list of game titles may include game titles already purchased by the player accounts and free-to-play game titles. In embodiments of the present application, the list of game titles may further include game titles available in the game server 110 for the purchase or subscription by the player accounts. Alternatively if the above processes are initialised within a game title, or the relevant game server is specific to one game title, then this step and step 505 below may not be necessary.

At step 505, the user selects a game title from the list of game titles provided by the game server 110. In embodiments of the present application, the user may be allowed to purchase or subscribe new game titles.

At step 506, the game client 120 may determine the optimal display settings, such as such as screen resolution, aspect ratio, frame rate and 3D render settings, of each split screen based on the available screen resolution of the selected game title and specification of the display device, such as maximum screen resolution and refresh rate. For example, for a display device supporting 4K Ultra HD (3840×2160) serving four players, it may be determined that the screen display can be split into four sub-screens with resolution 1920×1080 each. The optimal screen resolution setting is transmitted to the game server 110. In embodiments of the present application, the client device 120 may allow the user to customize the display settings including the screen resolution and aspect ratio of each split screen.

At step 507, the game server 110 assigns an individual game machine to each of the player accounts, optionally according to the performance requirements of the selected game title. The game machines may be physical game machines such as game consoles. In embodiments of the present application, the game machines may be virtual game machines configured to provide the appropriate execution environment for the game streaming service.

At step 508, the game server 110 retrieves the game code of the selected or default game title from the game titles database, and load it to each of the game machines assigned to the player accounts. The game server 110 optionally further accesses user save data of player accounts. For example, the user save data may include the parameters of the player's avatar, the game resources and achievement of the player, and the player's last gameplay progress location.

At step 509, each of the game machines assigned to the player accounts executes an instance of the game to generate a game environment and initiate interactive gameplay for the respective player account. The game machines additionally synchronize game data with each other in order to link the game environments with respect to each instance of the game for each player account. As such, the players are allowed to experience the same game elements and interact with each other in the linked game environment. The game data to be synchronized may include the players' status and location in the game, map data, and parameters of the game characters. In embodiments of the present application, the game may accommodate massive number of players, such as a massive multiplayer game, in which case the game machines may synchronize game data with other game machines assigned to player accounts on other game clients which may be in different physical locations.

As noted previously herein, whilst there may be many thousands of concurrent players of a multiplayer game, to accommodate these players typically the server hosts parallel versions of the game each occupied and shared by a smaller number of players.

It is therefore desirable to ensure that the players who are sharing the split screen of the game client are all assigned to the same version of the game, so that they can potentially interact with each other and, for example, in-game events (such as game start, game goals, environmental changes and the like) are automatically synchronised.

Accordingly the game client may include with its requests to the game server a message, flag, metadata or other indicator that the requests it is making on behalf of player/guest accounts are for a split-screen implementation of the multiplayer game.

The server may then keep track of these player/guest accounts when selecting a version of the game, so that all the running instances of the game associated with these accounts are assigned to the same version and hence share a commonly hosted version of the game. This may also include determining that there is sufficient space within a given version of the game; for example a game version that can host 32 players must have at least 4 slots currently free if a group of 4 players are associated with one split-screen game client.

Alternatively or in addition to the game client including with its requests to the game server a message, flag, metadata or other indicator, the game client may send the request as a bundled request in a predetermined format, and/or the server may detect that the same game client has requested multiple instances of the game to be started and infer that therefore these should be assigned to a same version of the game.

According to embodiments of the present application, since the game code is executed by the game machines in the game server 110, most of the computations are performed at the game server side, for example, the rendering of textures, polygons in a 3D game environment from multiple perspective views. Instead, the game client 120 is responsible for mixing multiple video streaming signals into split screen, by adjusting the screen resolution and aspect ratio of each player's view. The workload of the local game client 120 can therefore be greatly reduced.

The arrangement according to embodiments of the present application may also improve graphics quality, such as providing higher screen resolution and frame rate of the game, because the graphics performance is no more limited by the hardware configuration of the local game client 120. Comparing to the local game client 120, the game server 110 may provide scalability and flexibility in allocating computational resources for running games of different requirements. The arrangement may also address screen tearing issues due to display device getting out of sync with the graphics processing unit. Since all video graphics is now directly provided by streaming, the aforesaid video synchronization problem can be avoided.

The multiplayer game system according to embodiments of the present application is also able to support more players by one game client, especially for the case where a game with demanding graphical specifications is run and the computational resource required is multiplied by the number of players. Since the game is now executed by game machines in the game server 110, the number of players is no more limited by the processing power of the local game client 120.

The multiplayer game system according to embodiments of the present invention further provide the benefit that only one game client is required for multiple players at the same physical location to play a network game based on different player accounts.

The multiplayer game system is beneficial over traditional online multiplayer games because it facilitates players gaming at the same location by removing the need to set up additional game clients. The multiplayer game system facilitates players gaming at the same location which can enhance social experience, and in the meantime, allow better communication between players which is advantageous for gameplay such as cooperative multiplayer games, war games arena battle games.

Comparing to conventional local multiplayer games, the multiplayer game system according to embodiments of the present application provides benefits such as portability and flexibility. For example, player profiles and game progress can be saved in the network so that the gameplay can be continued in other platforms or game clients, together or separately, at another time. This is particularly important for game genres involving long game hours such as adventure games and role-play games. Moreover, the game experience can be easily extended to massive multiplayer online games with a greater number of players participating, which conventionally require separate game clients to play.

At step 510, users provide interactions in the gameplay via game controllers associated with individual player accounts. The game client 120 receives user inputs from the game controllers and transmits the user inputs to the game server 110 for running the interactive gameplay, for example, enabling the player to interact with the game elements in the game environment.

The game client 120 indicates to the game server 110 which player/guest account the received user inputs are associated with. The server then routes the inputs to the appropriate game machine 221. Equivalently the identity of the controllers may be initially associated with the player/guest accounts, and then the identity of the respective controller may be included with the user inputs to enable them to be routed appropriately.

At step 511, each game machine generates video data, for example using a graphics engine, audio data (individual and universal audio data), and optionally haptic feedback data of the linked game environment from the relevant player's perspective according to the game logic. In particular, the video data may be generated from different camera positions in the game environment, such as a first person point of view (POV) perceiving the linked game environment through the eyes of the game character, or a third person point of view offering a wider field of view of the surrounding environment of the game character. Additionally, any haptic feedback data may be processed to produce force feedback effects at a controller device or other interface devices, such as a vibration of the device.

At step 512, the game server 110 captures the video data and audio data generated by the multiple game machines and encode the same into video streams and audio streams. In addition, the encoding may provide for compression of the video and audio streams to reduce transmission bandwidth and avoid lagging of gameplay. Data compression is particularly beneficial because the data rate of the video streams is multiplied by the number of players in the multiplayer game.

At step 513, the game server 110 transmits the encoded video streams and audio streams, optionally together with the haptic feedback data, to the game client 120 over the network 150, such as the Internet.

At step 514, the game client 120 receives video streams and audio streams from the game server 110, decompresses and decodes the streaming data into raw video data and raw audio data. At step 515, the game client 120 proceeds to mix the video data into split screen view in accordance with the determined optimal screen resolution. The game screens for each player in the split screen view may be arranged in a horizontal manner or in a vertical manner. The mixed video data is transmitted to the display device 140 through the video port. In embodiments of the present application, the game client 120 determines if the video data for the multiple user accounts have the same contents, in which case, the game client 120 will switch to a shared screen mode to generate video data in full screen view, instead of multiple copies of the same content in split screen view.

According to embodiments of the present application, the game server 110 may mix the video data, encoded video data or video streams generated by the virtual machines and arrange them to be displayed in split screen view. The game server 110 subsequently transmits a video stream containing the split screen view to the game client 120. Upon receiving the video stream, the game client 120 is only required to convert the video stream to video data without the need of performing any screen splitting operations. This advantageously reduces the workload of the game client 120 and the amount of video data required to be transmitted from the game server 110 to the game client 120. In embodiments of the present application, the game server 110 may determine if the video data for the multiple user accounts have the same contents, in which case, the game server 110 will switch to a shared screen mode to generate video data in full screen view, instead of multiple copies of the same content in split screen view.

At step 516, optionally the game client 120 receives haptic feedback data from the game server 110 and demultiplexes the signals to respective game controllers associated with the corresponding player accounts.

At step 517, the game client 120 transmits the decoded audio data to the speakers via the audio port. The audio data may contain universal audio tracks and sound effects of the linked game environment shared by the players. In embodiments of the present application, the audio data may contain player specific sound tracks and sound effects generated from the player's perspective. If it is detected that headphones associated with the respective player accounts are connected to the game client 120, or optionally that each controller contains a speaker, the game client 120 may demultiplex the user specific audio data to corresponding headphones or speakers.

Figure 6:
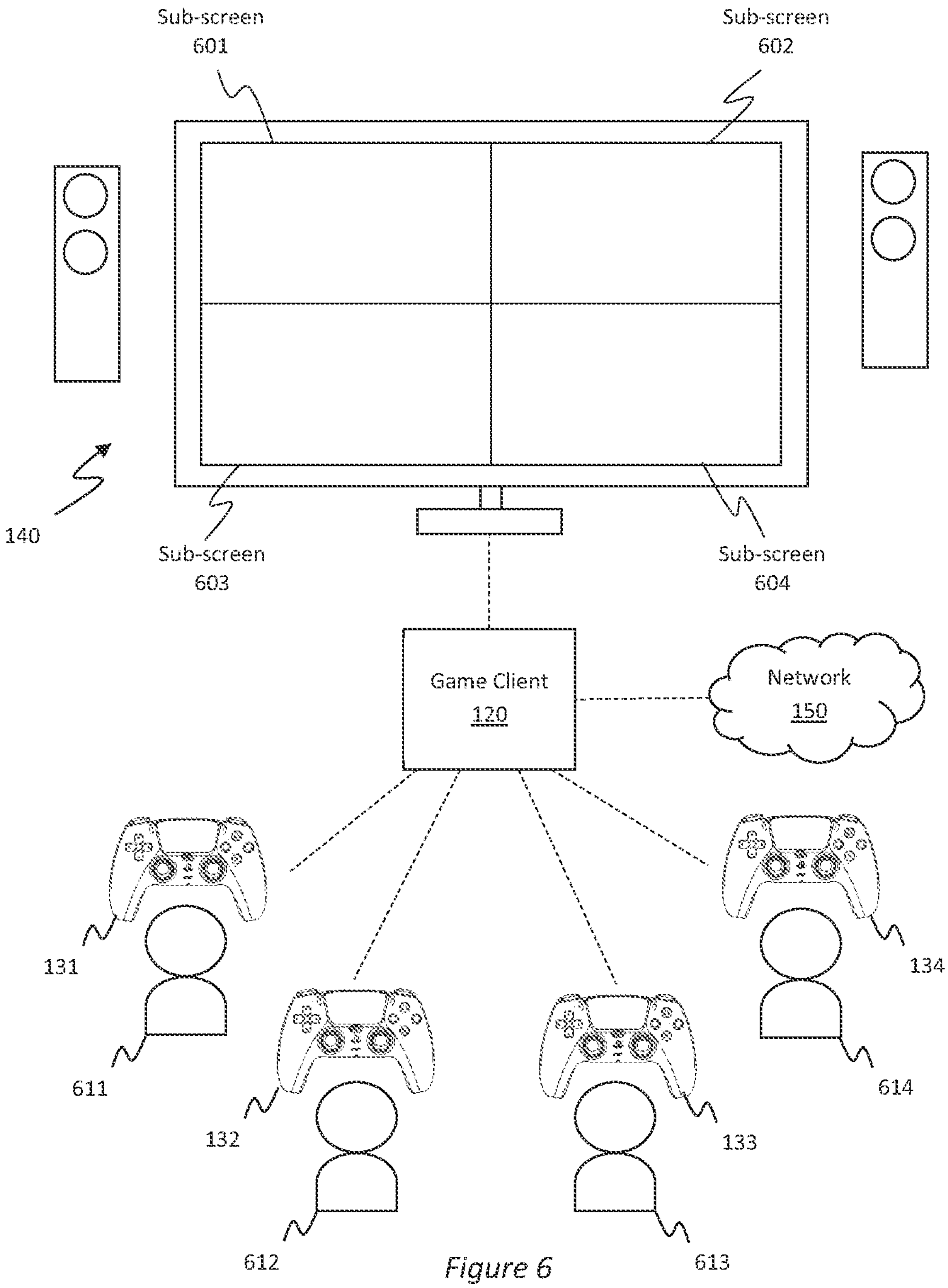
FIG. 6 is an example scenario in which a video game is executed in a split screen view on a multiplayer video game system in accordance with embodiments of the present application.

FIG. 6 illustrates an example scenario in which multiple players are playing a video game in a split screen view on a multiplayer video game system of FIG. 1 in accordance with embodiments of the present application. A user, for example the first player 611, may start by connecting a controller 131 to a game client 120 and login a game streaming platform on a remote game server 110 (not shown) via a network 150. The game client 120 may ask, via a message shown on the display device 140, the user to enter login details for his player account if necessary. As discussed above, the login details may include user account name, password, server name, and country/region in which the server is located or the user account is registered. Once the first player has successfully entered the game streaming platform, he may choose to activate the multiplayer split screen mode to allow other players 612-614 in the same physical location to play multiplayer online games together via the game client 120. The game client 120 may then ask other players 612-614 to enter their respective login details for the game streaming platform, if necessary. In embodiments of the present application, if a user name is not found in the user accounts database, or not provided by the user or the game client, the game server 110 may invite the user to register a new account, or treat then as a guest account typically in association with one of the registered player accounts.

After all players 612-614 have successfully entered the game streaming platform, the game server 110 may look up the user accounts database and provide the game client 120 a list of game titles allowed to be played by the user accounts of players 612-614. The game client 120 then shows the list of game titles in the display device 140 for the players to choose the desired game title. The list of game titles may include game titles already purchased by the player accounts and free-to-play game titles. In embodiments of the present application, the list of game titles may further include game titles available in the game server 110 for the purchase or subscription by the player accounts. Alternatively the game server may launch into a default game title.

The user, for example the first player 611, may select a game title among the list of game titles through his game controller 131. The game client 120 may determine the initial display settings of each player's game screen during the split screen mode, such as screen resolution, aspect ratio, frame rate and 3D render settings. Alternatively or in addition, the game client 120 may allow the players to customize the display settings to balance the game performance and visual effects. Furthermore, the game client 120 may assign a game screen position during split screen display to each of the players based on a default ordering. Alternatively or in addition, the game client 120 may allow the players to choose a desired position of their own game screen, for example based on their respective locations in the room. These user preferences regarding display settings may be stored in the local storage of the game client 102, and may also be adjusted by the user during the gameplay.

Once the display settings have been determined, the game client 120 may instruct the game server 110 to prepare for the gameplay, which includes assigning a game machine to each of the players, retrieving the relevant game code from the game title database, loading the game code and executing a game instance in each game machine, associating these game instances with a common version of the game environment being hosted by the server, synchronizing game data between various game machines, rendering a linked game environment and capturing video and audio data from each player's perspective, encoding the captured data into video and audio streams, and delivering the video streams, audio streams, and optionally haptic feedback data to the game client 120. In particular, any haptic feedback data may be generated based on game interaction of individual players, for example, vibration of car engine, car crashes, gunshots and explosions.

The game client 120 receives video streams corresponding to each of the multiple players 611-614 and arrange the player screens 601-604 to be displayed on the display device 104 in split screen view according to the determined display settings. Alternatively or in addition, the game client 120 may determine if the player screens are showing the same contents, for example a video clip at the beginning or the end of a game stage, in which case, the game client 120 will switch to a shared screen mode such that the game screen becomes a full screen view displaying only one copy of the contents. Alternatively these functions may be performed in the game server, which then transmits a single video stream already comprising the split or shared screen, as appropriate.

In the meantime, players 612-614 may interact with the game environment via their game controllers 131-134, such as steering a racing vehicle or shooting a target. The game controllers 131-134 generate input signals which are transmitted to the game client 120, and together with information identifying the associated player, further on to the game server 110 for executing the interactive gameplay.

Additionally, the game client 120 demultiplexes any haptic feedback data to individual controllers 131-134, which will be processed to produce force feedback effects, such as different vibration patterns, in the controllers 131-134 in response to the player's interaction with the gameplay.

The audio streams for each player are decoded by the game client 120 into audio data which is in turn transmitted to the speakers for playback. The audio data may contain universal audio tracks and sound effects of the linked game environment shared by the players, such as background music or ambient sound tracks. Alternatively or in addition, the players 612-614 may have personal headphones connected with the game client 120 such that player specific sound tracks and sound effects generated from the player's perspective can be delivered to the corresponding player through the headphones.

Where the audio is being played on a common set of speakers (for example TV speakers), then the audio from each player's instance of the game may be added together and output as a universal audio track. Optionally, and particularly if there small delay or synchronisation issues are anticipated, the game client and/or the game server may select audio settings for the instances of the game that improve this experience for the players. For example background music and/or in-game announcements may only be selected for one player, so that otherwise replicated audio is only played out once.

It will be appreciated that the above methods may be carried out on conventional hardware suitably adapted as applicable by software instruction (e.g. game server 110 and game client 120) or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Hence in a summary embodiment of the present description, a multiplayer video game system comprises the following.

Firstly, a communication module (e.g. network interface 270 of game server 110 or network interface 405 of game client 120) configured (for example by suitable software instruction) to connect a game client to a game server via a communication network, as described elsewhere herein.

Secondly, a game execution module (e.g: game machines 221 to 223 of game server 110) is configured (for example by suitable software instruction) to execute, for each player, an instance of a game on the game server to generate a game environment, as described elsewhere herein.

Thirdly, a synchronization module (e.g.: game server logic 210, in conjunction with game machines 221 to 223 of game server 110) is configured (for example by suitable software instruction) to synchronize game data between multiple instances of the game to link the generated game environments, as described elsewhere herein. In particular, typically the game server ensures that the instances of the player/guest accounts from the same game client are assigned to the same shared version of the game, and not between two or more separate versions.

Fourthly, a user interface module (e.g.: controller interface 480, in conjunction with game client logic 410 and network interface 405 of game client 120) is configured to (for example by suitable software instruction) transmit user inputs to the game server to initiate interactive gameplay, as described elsewhere herein. In particular, inputs from each player are made identifiable so as to be routed to the correct instance of the game on the server.

Fifthly, a video streaming module (e.g.: audio/video encoder 250 and streaming server logic 260, in conjunction with game machines 221 to 223 of game server 110) is configured (for example by suitable software instruction) to generate, for each player, a video stream of the linked game environment from the player's perspective, as described elsewhere herein.

Sixthly, a video mixing module (e.g.: screen splitter 440, in conjunction with audio/video decoder 430 and streaming client logic 420 of game client 120) is configured (for example by suitable software instruction) to mix the video streams for individual players into split screen view during a split screen mode, as described elsewhere herein.

It will be apparent to a person skilled in the art that variations in the above system corresponding to the various embodiments of the method as described and claimed herein are considered within the scope of the present invention, including but not limited to that:

In an instance of the summary embodiment, the method comprises the step of switching to a shared screen mode when the contents of the video streams for individual players are the same, wherein the contents of the video streams are displayed in full screen view, as described elsewhere herein;

In an instance of the summary embodiment, the method comprises the step of allocating the respective instance of the game of each player to the same shared version of the game on the game server, as described elsewhere herein;

In an instance of the summary embodiment, the method comprises the step of generating universal audio data of the linked game environment containing audio data shared between the players, as described elsewhere herein;

In an instance of the summary embodiment, the method comprises the steps of: (i) for each player, generating personal audio data of the linked game environment from the player's perspective; and (ii) playing in a player's headphone the personal audio data corresponding to the player, as described elsewhere herein;

In an instance of the summary embodiment, the video streams for individual players are transmitted to the game client, and the mixing of the video streams is performed at the game client, as described elsewhere herein; and In an instance of the summary embodiment, the mixing of the video streams is performed at the game server, and the mixed video stream containing the split screen view is transmitted to the game client, as described elsewhere herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method comprising:

connecting a game client to a game server via a communication network;

for each player, executing an instance of a game on the game server to generate a game environment;

synchronizing game data between multiple instances of the game to link the generated game environments;

transmitting player inputs to the game server to initiate interactive gameplay;

for each player, determining a player-selected position of a respective video stream in a split screen view;

for each player, determining a player-selected display setting of the respective video stream in the split screen view;

for each player, generating the respective video stream of the linked generated game environment from a respective player's perspective; and mixing the respective video stream for each player into split screen view during a split screen mode in accordance with each player-selected position and player-selected display setting.

2. The method according to claim 1, further comprising:

allocating the respective instance of the game of each player to a same hosted version of the game on the game server.

3. The method according to claim 1, further comprising:

generating universal audio data of the linked generated game environment containing audio data shared between the players; and playing the universal audio data in a speaker.

4. The method according to claim 1, further comprising:

for each player, generating personal audio data of the linked generated game environment from the respective player's perspective; and playing in a player's headphone the personal audio data corresponding to the player.

5. The method according to claim 1, wherein the respective video stream for each player are transmitted to the game client, and the mixing of the video streams is performed at the game client.

6. The method according to claim 1, wherein the mixing of the video streams is performed at the game server, and the mixed video stream containing the split screen view is transmitted to the game client.

7. A non-transitory, computer-readable medium containing a computer program comprising computer executable instructions adapted to cause a computer system to:

connecting a game client to a game server via a communication network; for each player, executing an instance of a game on the game server to generate a game environment;

synchronizing game data between multiple instances of the game to link the generated game environments;

transmitting player inputs to the game server to initiate interactive gameplay;

for each player, determining a player-selected position of a respective video stream in a split screen view;

for each player, determining a player-selected display setting of the respective video stream in a split screen view;

for each player, generating the respective video stream of the linked generated game environment from a respective player's perspective; and mixing the respective video stream for each player into split screen view during a split screen mode in accordance with each player-selected position and player-selected display setting.

8. A game server, comprising:

a circuit operating to connect to a game client via a communication network;

a circuit operating to execute an instance of a game for each player on the game server to generate a game environment; a circuit operating to synchronize game data between multiple instances of the game to link the generated game environments;

a circuit operating to receive player inputs from the game client to initiate interactive gameplay;

a circuit operating to determine a player-selected position of a respective video stream for each player in a split screen view;

a circuit to operating to determine a player-selected display setting of the respective video stream for each player in the split screen view;

a circuit operating to generate the respective video stream, for each player, of the linked generated game environment from a respective player's perspective;

a circuit operating to mix the respective video stream for each player into the split screen view during a split screen mode; and a circuit operating to transmit the mixed video stream to the game client in accordance with each player-selected position and player-selected display setting.

9. The game server according to claim 8, further comprising: a circuit operating to allocate the respective instance of the game for each player to a same hosted version of the game on the server.

10. The game server for a multiplayer video game according to claim 8, further comprising: a circuit operating to generate universal audio data of the linked generated game environment containing audio data shared between the players.

11. The game server according to claim 8, further comprising: a circuit operating to generate personal audio data, for each player, of the linked generated game environment from the respective player's perspective.

12. A game client, comprising:

a circuit operating to connect to a game server via a communication network;

a circuit operating to transmit player inputs to the game server to initiate interactive gameplay;

a circuit operating to transmit a player-selected position of a respective video stream for each player in a split screen view;

a circuit to operating to transmit a player-selected display setting of the respective video stream for each player in the split screen view;

a circuit operating to receive the respective video stream generated by the game server, for each player, of a linked generated game environment from a respective player's perspective; and a circuit operating to mix the respective video stream for each player into the split screen view during a split screen mode in accordance with each player-selected position and player-selected display setting.

13. The game client according to claim 12, further comprising:

a circuit operating to indicate to the game server that respective instances of a multiplayer video game should be run for each player, and these respective instances should be allocated to the same hosted version of the game on the server.

14. The game client according to claim 12, further comprising:

a circuit operating to receive, from the game server, universal audio data of the linked generated game environment containing audio data shared between the players; and a circuit operating to transmit the universal audio data to a speaker.

15. The game client according to claim 12, further comprising:

a circuit operating to receive, from the game server, personal audio data of the linked generated game environment from the respective player's perspective; and a circuit operating to transmit the personal audio data to a player's headphone.

* * * * *